United States Patent

[11] 3,590,264

| [72] | Inventor | Pierre Mathys<br>rue des Bossons 78-80, Petit-Lancy,<br>(Canton of Geneve), Switzerland |
|---|---|---|
| [21] | Appl. No | 785,701 |
| [22] | Filed | Dec. 20, 1968 |
| [45] | Patented | June 29, 1971 |
| [32] | Priority | Dec. 20, 1967, Feb. 23, 1968 |
| [33] | | Switzerland |
| [31] | | 17,864/67 and 2,624/68 |

[54] CONTROL DEVICE FOR THE STOPLIGHT IN A MOTORCAR
6 Claims, 5 Drawing Figs.

[52] U.S. Cl. ................................................. 307/10, 340/71, 340/69
[51] Int. Cl. .................................................. H02g 3/00
[50] Field of Search .......................................... 200/59 D, 86.5; 340/71 X, 72, 69 X; 307/10

[56] References Cited
UNITED STATES PATENTS

| 3,428,767 | 2/1969 | Pfeifer | 340/71 X |
| 1,527,151 | 2/1925 | Davis... | 340/69 UX |
| 1,661,343 | 3/1928 | Parcq | 200/59 D |
| 2,621,265 | 12/1952 | Alcoriza | 340/69 X |
| 3,281,786 | 10/1966 | Leichsenring | 340/69 X |
| 3,444,514 | 5/1969 | Wang Yang | 340/69 X |

*Primary Examiner*—Robert K. Schaefer
*Assistant Examiner*—H. J. Hohauser
*Attorney*—Stevens, Davis, Miller & Mosher ABSTRACT: A main switch inserted in the feeding circuit of the stop lamps of the car is closed by a control member responsive to a deceleration of the car either directly by inertia or over the control of the motorcar brake pedal. Opening that main switch is controlled by the accelerator pedal.

PATENTED JUN 29 1971

INVENTOR
PIERRE MATHYS

By Stevens, Davis, Miller & Mosher
ATTORNEYS

CONTROL DEVICE FOR THE STOPLIGHT IN A MOTORCAR

BACKGROUND OF THE INVENTION

1. Field of the Invention

This invention relates to the devices provided for switching on and off the stoplight in a motorcar.

2. Description of the Prior Art

The known control devices for the stoplight in a motorcar are exclusively actuated by the motorcar brake pedal. When the car driver actuates the brake pedal a switch connected to the feeding circuit of the stoplight is closed and switches on the stoplight. This switch opens and switches off the stoplight as soon as the car driver releases the brake pedal.

Thus in all the events in which the car driver takes notice of a hindrance on his way too late for stopping in time the collision usually has as a consequence that the car driver releases the brake pedal so that the stoplight of his car is switched off. Now this is often the cause of collisions in chain in particular when the first car is followed by other ones.

The purpose of the invention is to provide a control device for the stoplight in a motorcar which avoids such collisions by drawing the attention of the drivers of the following cars to the fact that the preceding one has stopped.

SUMMARY OF THE INVENTION

It is therefore an object of the invention to connect a main switch to the feeding circuit of the stoplight so that the closure of that switch is controlled by a member which carries out a predetermined motion concurrently with a deceleration of the vehicle, opening said switch being controlled by the motorcar accelerator pedal.

According to a further object of the invention the main switch connected to the feeding circuit of the stoplight is controlled by the motorcar brake pedal. Thus actuating the brake pedal switches on the stoplight upon braking and this stoplight will be switched off only when the car driver after having released the brake pedal actuates the accelerator again. The stoplight, which remains lit as long as the car driver does not actuate the accelerator, thus informs the driver of the following car that the driver of the preceding one is still braking. This second driver can accordingly deduce therefrom that there is still some hindrance in front of the preceding car.

In order to avoid that the stoplight lights furtheron even when after braking the driver has decided to pursue his travel, but is not compelled for that purpose to actuate the accelerator for instance because he is running downwards, the main switch connected to the feeding circuit of the stoplight can be mounted in parallel with a low-pressure electropneumatic switch also controlled by the brake pedal so as to be switched on upon actuating the brake and to be switched off upon releasing the brake pedal, the member controlling the closure of the main switch forming itself part of a high-pressure electropneumatic switch which is also controlled by the brake pedal. With such an arrangement the main switch connected to the feeding circuit of the stoplight is only switched on upon a strong braking. If the car driver only slightly brakes, for instance during a downward running, said main switch remains open so that the stoplight is switched off in the usual manner, i.e. as soon as the driver releases the brake pedal.

According to still a further object of the invention a timing device can be connected to the circuit comprising the main switch so as to produce an intermittent signal when the car driver releases the brake pedal after a strong braking.

Actuating the brake pedal is obviously not the only cause which can produce strong decelerations of the vehicle. The latter can, for instance, collide with an obstacle before its driver has actuated the brake. An engine defect which would, for instance, cause the main motor driving shaft to be suddenly locked would also produce a strong deceleration of the vehicle without actuating the brake. Finally, the car driver cam voluntarily produce a strong deceleration other than by braking, for instance by changing over to a lower speed in particular if the motor of his car is capable of exerting a strong braking action.

It is accordingly still another object of the invention to provide a main switch control member which is sensitive, for instance by inertia, to a strong deceleration of the car, said member forming 8c part of a secondary switch connected to a control circuit of the main switch and said secondary switch being arranged so as to be closed only when the deceleration of the vehicle exceeds a predetermined value.

Still further objects of the invention will become apparent in the course of the following description.

BRIEF DESCRIPTION OF THE DRAWING

Four embodiments of the control device according to the invention are represented diagrammatically and by way of example in the accompanying drawing.

In the drawing.

DESCRIPTION OF THE PREFERRED EMBODIMENTS

Figure 1:
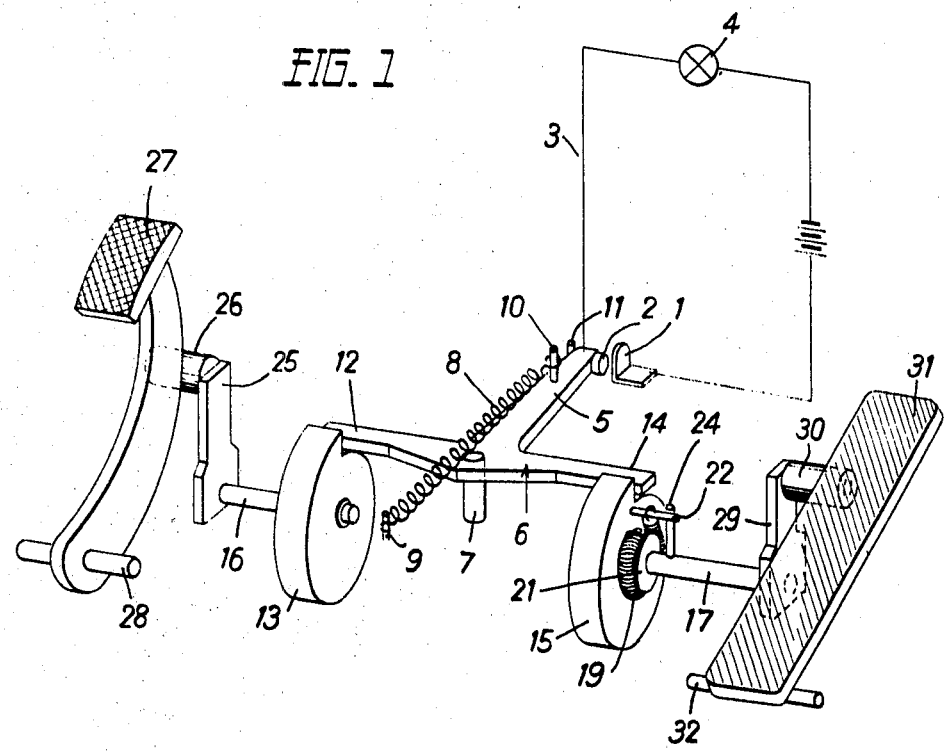
FIG. 1 is a perspective view of the first embodiment.
Figure 2:
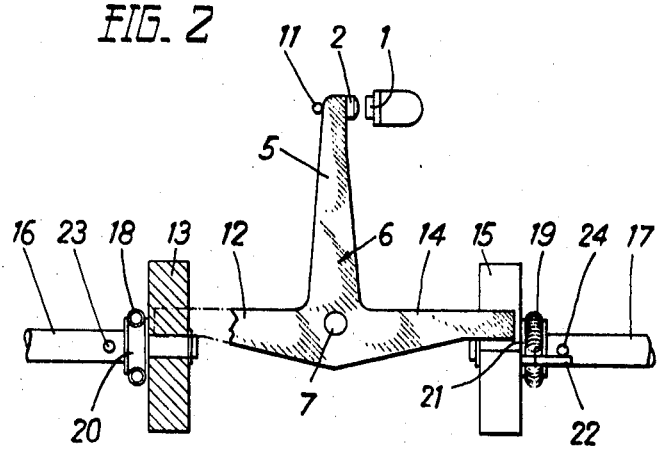
FIG. 2 is a plan view partly in section of a part of the device represented in FIG. 1.

The control device represented in FIGS. 1 and 2 comprises a main switch including a fixed contact 1 and a movable contact 2. Switch 1, 2 is connected to the feeding circuit 3 of the stop lamp (or lamps) 4 of the motorcar. The movable contact 2 of switch 1, 2 is carried by a first arm 5 of a three-armed lever 6 mounted for rocking motion about a pivot 7. A pulling spring 8 inserted between a fixed stud 9 and a pin 10 carried by arm 5 of lever 6 normally holds this lever 6 either in the position represented in the drawing in which spring 8 causes arm 5 to bear against a fixed stop 11, switch 1, 2 being open, or in a second position in which spring 8 causes the movable contact 2 to bear against the fixed contact 1 of switch 1, 2 thus holding this switch closed.

A second arm 12 of lever 6 is set under the action of a control member constituted by a cam 13. The third arm 14 of lever 6 is similarly set under the action of a cam 15. Both cams 13 and 15 are idly mounted on shafts 16 and 17 to which they are connected by means of coil springs 18, 19. Each spring 18, 19 is inserted between a part 20, 21 rigidly fixed to the corresponding shaft 16, 17 and a pin 22 carried by the corresponding cam. At rest each spring 18, 19 holds pin 22 in abutting engagement with a pin 23, 24 carried by the corresponding shaft 16, 17.

Shaft 16 carries an arm 25 provided with a crankpin 26 enabling actuation of shaft 16. As shown in FIG. 1 crankpin 26 extends in the path of the brake pedal 27 of the motorcar, which is mounted for rocking motion about shaft 28. Shaft 17 similarly carries an arm 29 provided with a crankpin 30 extending in the path of the accelerator pedal 31 mounted for rocking motion about a shaft 32.

If the car driver actuates the brake pedal 27 in the position represented in FIG. 1, this brake pedal actuates the crankpin 26 and causes shaft 16 to rotate thus bending spring 18. The latter drives cam 13 which actuates arm 12 of lever 6 thus causing the latter to rock until the movable contact 2 bears on the fixed contact 1 and closes the main switch connected to circuit 3. The stoplight 4 is switched on. Once the movable contact 2 has reached the fixed contact 1, lever 6 is stopped and it holds cam 13 at a standstill. Shaft 16 and crankpin 26 are however not prevented from moving further on under the action of the brake pedal 27 since cam 13 is idly mounted on shaft 16. According to the amplitude of the motion of the brake pedal 27 spring 18 will be bent more or less. When the car driver releases the brake pedal 27, the latter comes back in its position of rest and spring 18 causes shaft 16 and the crankpin 26 to move back together with the brake pedal. Spring 8 however holds lever 6 in the position which this lever reached upon depressing the brake pedal. Lever 6 will only return against stop 11 if the car driver actuates the accelerator 31. Pressing the accelerator pedal indeed causes shaft 17 to rotate, thus moving pin 24 away from pin 22. Upon rotating in that way shaft 17 bends spring 19 thus exerting a driving torque on cam 15 which will accordingly press on arm 14 of lever 6. During the backward motion of lever 6 arm 12 thereof can move cam 13 without difficulty, because crankpin 26 is free when the brake pedal 27 is at rest.

Whichever displacement is imparted to accelerator 31 about its shaft 32, lever 6 remains at rest as soon as it has reached stop 11, the only action of accelerator 31 on the control device disclosed residing in more or less bending spring 19.

In the second embodiment (FIG. 3), the control device comprises a three-armed lever 6a similar to lever 6 of the first embodiment. Lever 6a similarly opens and closes the main switch 1, 2 connected to the feeding circuit 3a of stoplight 4. Circuit 3a moreover includes a timer 33 which is arranged for producing an intermittent signal in circuit 3a when switch 1, 2 is closed, thus causing the stoplight 4 to blink. It will be observed that timer 33 is not indispensable and that circuit 3a could be the same as that of the first embodiment.

The control device according to the second embodiment differs from the first one by the means provided for controlling lever 6a. In the second embodiment this three-armed lever is controlled by a pair of electromagnets 34, 35 the armatures 36, 37 of which are carried by rods 38, 39, each one of which is jointed to the end of one arm of lever 6 a. The energizing circuits 40, 41 of electromagnets 34, 35 are fed in parallel by the same battery 42 which also feeds the circuit of stoplight 4. A microswitch 43 is set under the control of the brake pedal 27 and is connected to circuit 40. A similar microswitch 44 is set under the control of accelerator 31 and is similarly connected to circuit 41.

Figure 3:
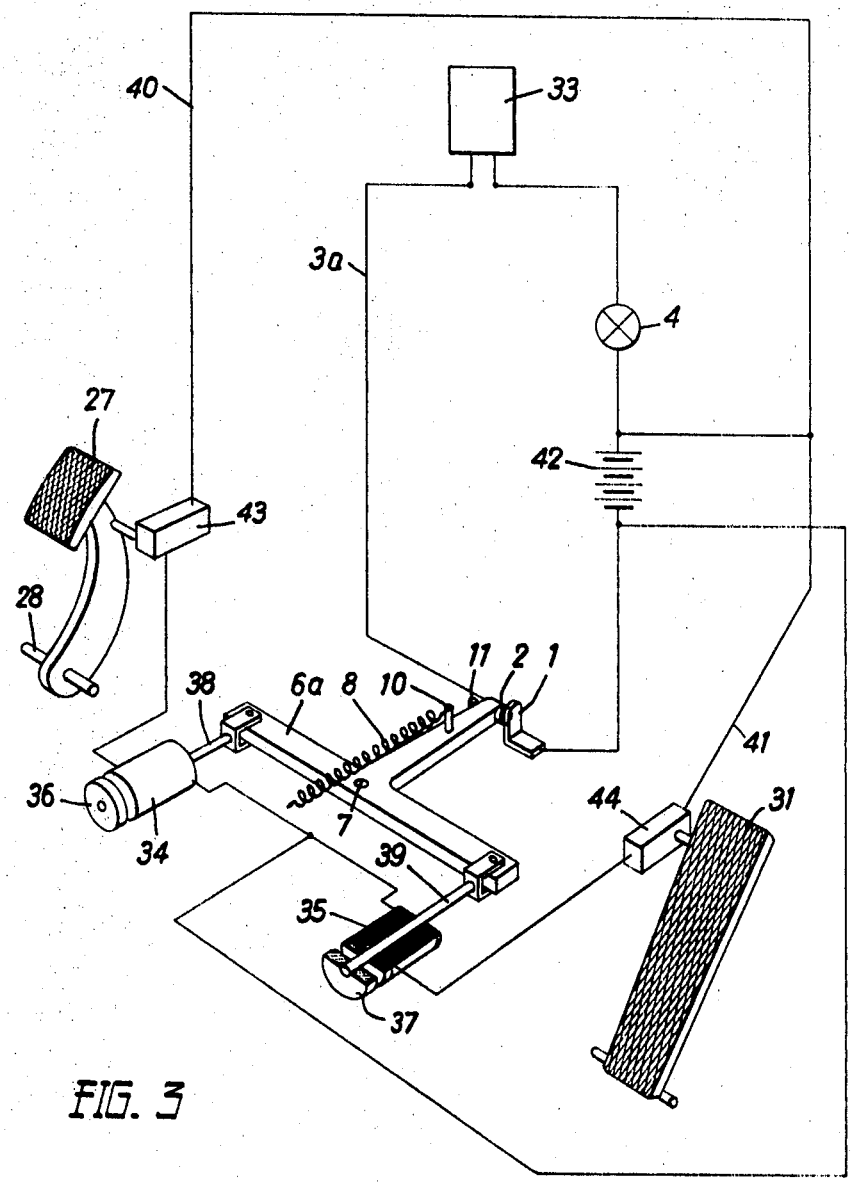
FIG. 3 is a perspective view of the second embodiment.

The device represented in FIG. 3 operates in a similar manner as that of FIGS. 1 and 2. Depressing brake pedal 27 actuates the microswitch 43 thus momentarily closing circuit 40. Electromagnet 34 pulls armature 36 which constitutes the member controlling the closure of main switch 1, 2. It is indeed armature 36 which causes lever 6a to rock. This lever remains in closing position until the car driver actuates accelerator 31. As soon as the latter pedal is depressed it actuates the microswitch 44 which momentarily closes the energizing circuit of electromagnet 35. Armature 37 is then pulled thus restoring lever 6a to its initial position of rest and opening switch 1, 2.

In the third embodiment (FIG. 4), the brake pedal 27 controls the brake linings 45 by hydraulic means. For this purpose pedal 27 actuates the piston rod 46 of a hydraulic cylinder 47 which is connected by means of a duct 48 to the brake cylinders 49, only one of which has been represented in the drawing. Duct 48 is connected by means of a first derivation 50 to a low-pressure electropneumatic switch 51 and by means of a second derivation 52 to a high-pressure electropneumatic switch 53. Switch 51 is adjusted so as to be closed as soon as the pressure increases within duct 48 and derivation 50. In other words switch 51 is closed as soon as pedal 27 actuates the brake linings 45. As regards switch 53 it is adjusted in such manner that it will only be closed upon a strong braking action, i.e. when the pressure in duct 48 and derivation 52 will increase in a relatively high ratio.

Figure 4:
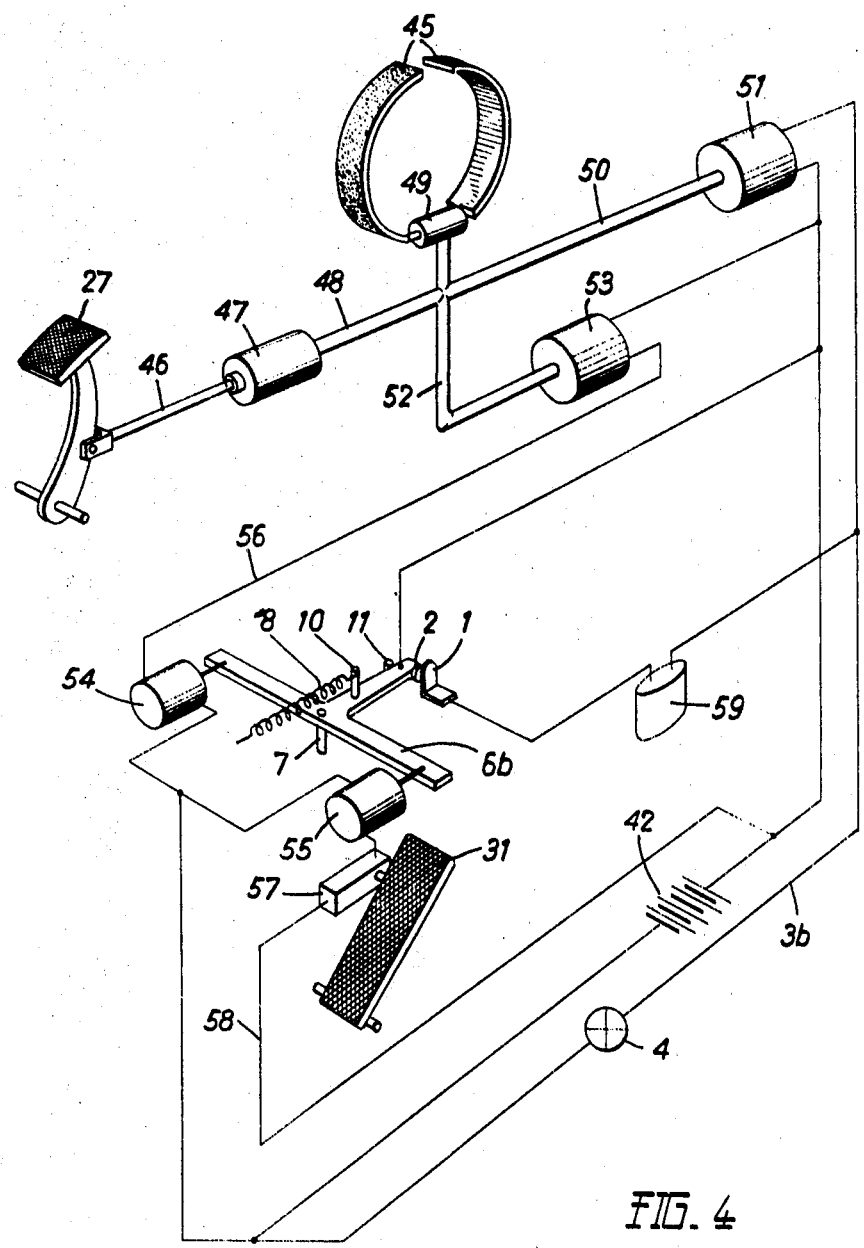
FIG. 4 is a perspective view of the third embodiment.

FIG. 4 shows that switch 51 is connected to the feeding circuit 3b of the stoplight 4 of the car.

The control device represented in FIG. 4 comprises as the two first embodiments a main switch 1, 2 which is also connected to the feeding circuit 3b in parallel with switch 51. As in the second embodiment the movable contact 2 of switch 1, 2 is carried by a first arm of a three-armed lever 6b controlled by a pair of electromagnets 54, 55. As regards switch 53 it is connected to the energizing circuit 56 of electromagnet 54. A microswitch 57 set under the controlling action of the accelerator pedal 31 is connected to the energizing circuit 58 of electromagnet 55. A timer 59 is finally connected in series with switch 1, 2.

The control device of FIG. 4 operates in the following manner:

When the brake switch 27 is depressed only for a light braking action as, for instance, when running downwards, switch 51 alone is actuated by cylinder 47. The closure of switch 51 switches on the stoplight 4. The latter will be switched off as soon as the brake pedal 27 will be released. On the contrary, if the brake pedal is strongly actuated, switch 53 will also be closed. The movable contact of that switch which constitutes the member controlling the closure of the main switch 1, 2, will thus be actuated. The closure of switch 53 indeed energizes electromagnet 54 thus causing lever 6b to rock about pivot 7 and to close switch 1, 2. As long as the car driver has his foot on the brake pedal 27, switch 51 maintains the stop lamps lighting in a continuous manner. Upon releasing pedal 27 switch 51 opens, but switch 1, 2 remains closed. Under the control of timer 59 the stoplight 4 is accordingly blinking. This stoplight will only be switched off when the car driver actuates the accelerator 31 again. As in the second embodiment the accelerator 31 actuates the microswitch 57 thus energizing electromagnet 55 and rocking back lever 6b into its position of rest and opening switch 1, 2.

The different electric circuits of the device represented in FIG. 4 are fed by the same battery 42 as in the second embodiment.

In the fourth embodiment (FIG. 5) the brake pedal 27 also controls the brake linings 45 of the motorcar by hydraulic means. For this purpose pedal 27 actuates the piston rod 46 of a hydraulic cylinder 47 which is connected to the brake cylinders 49 by means of a duct 48. Duct 48 is in turn connected by means of a derivation 50 to a low-pressure electropneumatic switch 51. Switch 51 is adjusted in such manner as to be closed as soon as the pressure increases within duct 48 and derivation 50. In other words switch 51 is closed as soon as pedal 27 actuates the brake linings 45. Switch 51 is connected to the feeding circuit 3c of the stoplight 4 of the vehicle.

The control device comprises as those of the three first embodiments a main switch 1, 2 connected to circuit 3c in parallel with switch 51. The movable contact 2 of switch 1, 2 is carried by one arm of a three-armed lever 6c which is actuated in the same manner as in the third embodiment by means of a pair of electromagnets 54, 55. The fourth embodiment however differs from the third one by the fact that it comprises a secondary switch 60 connected to the energizing circuit 61 of electromagnet 54. The movable contact of switch 60 is carried by an arm 62 which is mounted for rocking motion about a shaft 63 and which constitutes the member controlling the closure of the main switch 1, 2. For this purpose arm 62 is rigidly connected to an arm 64 which carries a weight 65, arm 64 and weight 65 operating as a pendulum of inertia. Switch 60 is usually open. When the vehicle is subjected to a deceleration, weight 65 tends to move in the direction of arrow a thus causing arms 64 and 62 to rock about shaft 63. When the deceleration of the vehicle has a strength ranging above a predetermined value, the weight 65 closes switch 60.

A microswitch 57 set under the controlling action of the accelerator pedal 31 is connected to the energizing circuit 51 of electromagnet 55. A timer 66 and a checking lamp 67 are finally connected in series with switch 1, 2 to the feeding circuit of the stoplight.

The controlling device represented in FIG. 5 operates in the following manner:

Depressing the brake pedal 27 for a light braking as, for instance when running downwards, closes switch 51 while weight 65 does not close the secondary switch 60. The stoplight 4 is accordingly switched on by switch 51. It will be switched off as soon as pedal 27 will be released.

On the contrary, if the vehicle is subjected to a strong deceleration produced either by a strong action on pedal 27 or by a braking action exerted by the motor or by any other cause, the weight 65 closes switch 60 thus energizing electromagnet 54. This electromagnet accordingly causes the three-armed lever 6c to rock about its pivot 7 thus producing the closure of the main switch 1, 2. If the strong deceleration has been produced upon actuating pedal 27, switch 51 will hold lamp 4 lighting permanently as long as the car driver has his foot on pedal 27. As soon as the latter is released switch 51 opens, but switch 1, 2 remains closed under the action of spring 8 which is anchored to a pin 10 carried by lever 6c, thus holding the movable contact 2 of this switch in abutting engagement with the fixed contact 1. As if the strong deceleration of the vehicle had been produced other than by actuating pedal 27, timer 66 causes the stoplight 4 to blink. Lamp 67 is of course blinking at the same time thus informing the car driver in particular if lamp 67 is mounted on the instrument board of the vehicle.

The stoplight is only switched off at the moment at which the car driver actuates the accelerator 31. The latter actuates itself the microswitch 57 which energizes electromagnet 55 thus moving lever 6c back into its position of rest and opening switch 1, 2 which switches off the stoplight 4.

Figure 5:
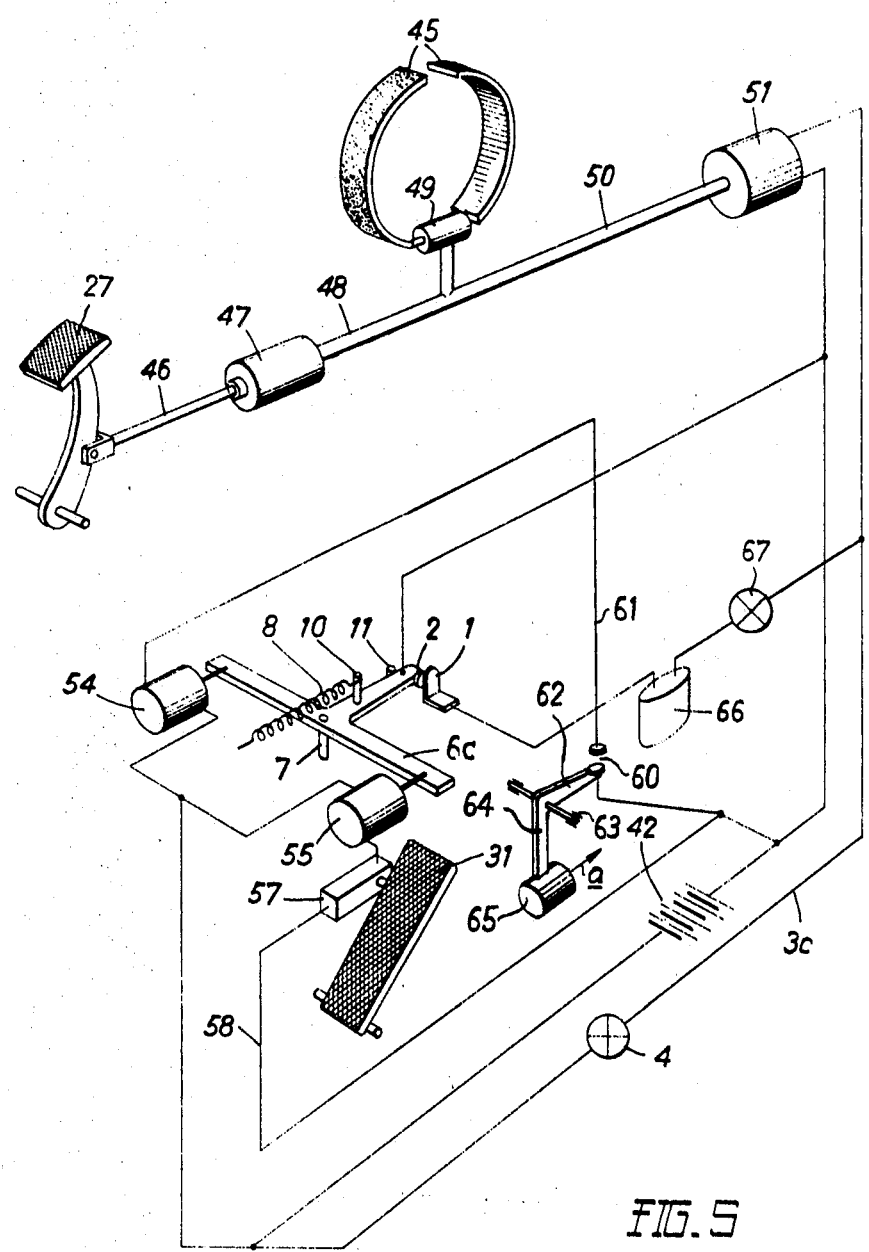
FIG. 5 is a perspective view of the fourth embodiment.

As in the two preceding embodiments the different electric circuits of the device represented in FIG. 5 are fed by the same battery 42.

If desired, blinking of the stoplight 4 and of lamp 67 could also be ensured as soon as pedal 27 is actuated and not only at the moment at which that pedal is released. For that purpose the stop 11 could be replaced by a second fixed contact similar to contact 1 and a second movable contact similar to contact 2, be mounted on lever 6c, the low-pressure electropneumatic switch 51 being connected to the second fixed contact instead of being connected to battery 42. Upon rocking under the effect of a strong braking action, lever 6c would then open the second contact, which is closed by the three-armed lever 6c when the same is at rest, switch 51 being thus out of service and the circuit of stoplight 4 being now only closed by switch 1, 2 through the timer 66.

In practice the secondary switch 60, the electromagnets 54, 55, the three-armed lever 6c, the main switch 1,2 and the microswitch 57 are mounted within the same casing which can be secured onto the floor of the motorcar on the side of the accelerator pedal 31.

Whichever the nature of the member controlling the closure of the main switch 1, 2 may be, i.e. whether the predetermined motion of this member which causes said closure is the cause or the consequence of a deceleration of the vehicle, it will be observed that said member carries out its motion concurrently with a deceleration of the vehicle and causes the main switch 1, 2 to be closed every time informing the driver of the following car may be significant.

I claim:

1. A device for controlling a stoplight in a motorcar comprising, in combination, a feeding circuit for said stoplight, a main switch inserted in said feeding circuit, closing means operatively connected to said main switch and including a control member controlled by the operation of a brake of said motorcar to carry out a predetermined motion upon actuation of said brake, said control member being adapted to cause said closing means to close said main switch when carrying out said predetermined motion, and opening means being under the control of an accelerator of said motorcar and operatively connected to said main switch, said opening means being adapted to cause said main switch to open upon actuation of said accelerator; further comprising a low-pressure electropneumatic switch mounted in parallel with said main switch and set under the control of said brake and adapted to close upon actuation of said brake and to open upon the release of said brake, said control member forming part of a high-pressure electropneumatic switch set under the control of said brake and adapted to close upon actuation of said brake with a strength exceeding a predetermined value, said high-pressure electropneumatic switch causing said control member to carry out said predetermined motion when it is closed.

2. The control device as claimed in claim 1, further including timing means mounted in series with said main switch.

3. A device for controlling a stoplight in a motorcar comprising, in combination, a feeding circuit for said stoplight, a main switch inserted in said feeding circuit, closing means operatively connected to said main switch and including a control member controlled by the operation of a brake pedal of said motorcar to carry out a predetermined motion concurrently with a deceleration of said motorcar upon actuation of said brake pedal, said control member being adapted to cause said closing means to close said main switch when carrying out said predetermined motion, and opening means being under the control of an accelerator of said motorcar and operatively connected to said main switch, said opening means being adapted to cause said main switch to open under actuation of said accelerator; said main switch having a fixed contact and a movable contact, and including a three-armed lever mounted for rocking motion between two end positions, spring means acting on said three-armed lever for holding the same in either one of its two end positions, a first arm of said three-armed lever carrying the movable contact of said main switch, said movable contact bearing on said fixed contact being adapted to close said main switch when said three-armed lever is in one of its end positions, said movable contact being in a remote position and being adapted to open said main switch when said three-armed lever is in its other end position, a second arm of said three-armed lever being set under the control of said brake, and said third arm of said three-armed lever being set under the control of said accelerator.

4. The control device as claimed in claim 3, further comprising first mechanical and yieldable motion-transmitting means connecting the motorcar brake to said second arm of said three-armed lever, and second mechanical and yieldable motion-transmitting means connecting the motorcar accelerator to said third arm of said three-armed lever.

5. The control device as claimed in claim 3, further comprising a first electromagnet having an armature mechanically connected to said second arm of said three-armed lever and an energizing circuit including a microswitch set under the control of the motorcar brake, and a second electromagnet having an armature mechanically connected to said third arm of said three-armed lever and an energizing circuit including a microswitch set under the control of the motorcar accelerator.

6. A device for controlling a stoplight in a motorcar comprising, in combination, a feeding circuit for said stoplight, a main switch inserted in said feeding circuit, closing means operatively connected to said main switch and including a control member adapted for carrying out a predetermined motion concurrently with a deceleration of said motorcar, said control member causing said closing means to close said main switch when carrying out said predetermined motion, a control circuit of said main switch arranged for closing the same when it is energized, a secondary switch inserted in said control circuit, said control member forming part of said secondary switch and being sensitive to a deceleration of said motorcar to carry out said predetermined motion, thereby being adapted to close said secondary switch when said deceleration ranges above a predetermined limit, and opening means operatively connected to said main switch and set under the control of an accelerator of said motorcar, said opening means being adapted to open said main switch upon the actuation of said accelerator.